May 8, 1962   J. B. WILLARD   3,032,809
METHOD AND APPARATUS FOR PRODUCING PLASTIC BOTTLES
Original Filed Feb. 26, 1954   2 Sheets-Sheet 1
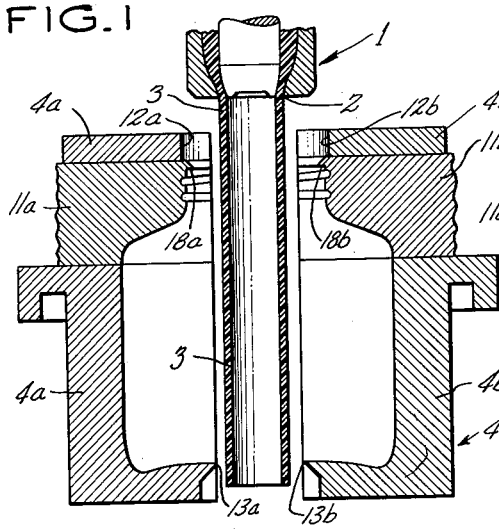
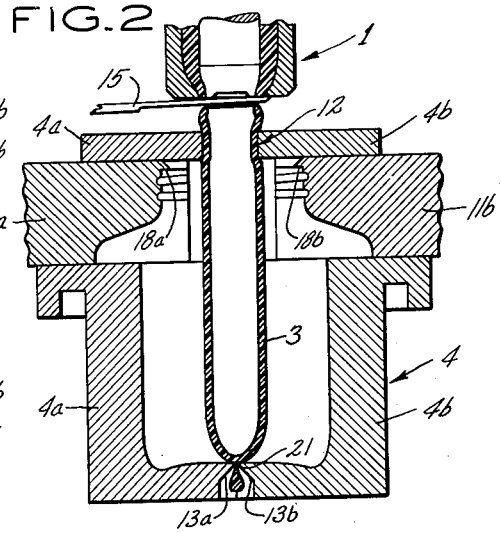
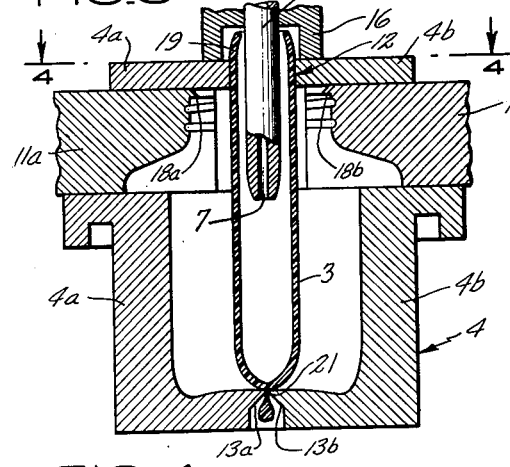
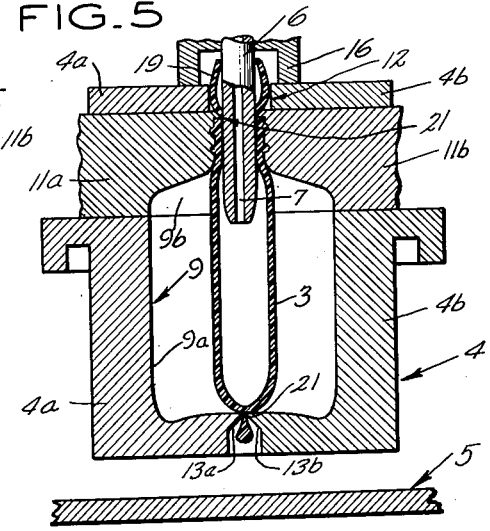
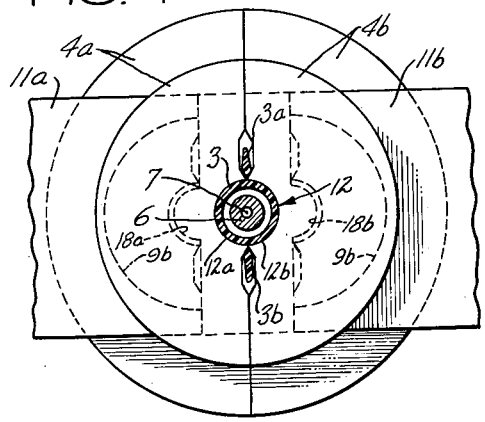
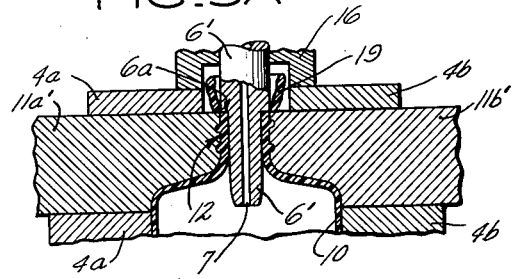
INVENTOR
JOHN B. WILLARD
BY Bates & Willard
ATTORNEYS May 8, 1962 J. B. WILLARD 3,032,809
METHOD AND APPARATUS FOR PRODUCING PLASTIC BOTTLES
Original Filed Feb. 26, 1954 2 Sheets-Sheet 2
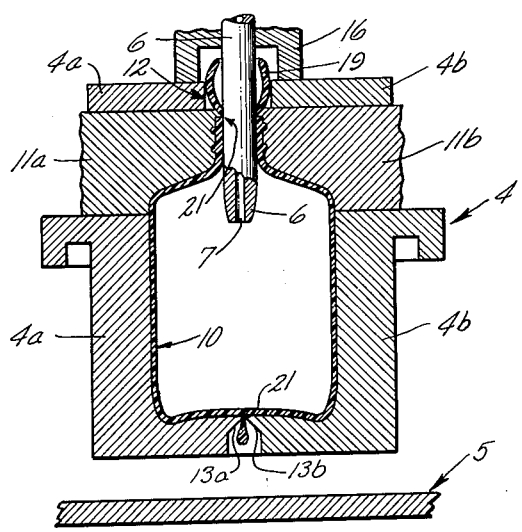
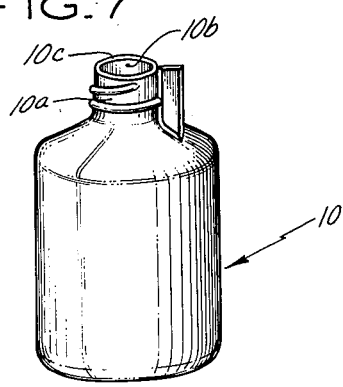
INVENTOR
JOHN B. WILLARD
BY Bates + Willard
ATTORNEYS United States Patent Office 3,032,809
Patented May 8, 1962

3,032,809
METHOD AND APPARATUS FOR PRODUCING PLASTIC BOTTLES
John B. Willard, West Hartford, Conn., assignor, by mesne assignments, to Owens-Illinois Glass Company, Toledo, Ohio, a corporation of Ohio
Continuation of application Ser. No. 412,735, Feb. 26, 1954. This application May 16, 1960, Ser. No. 29,450
10 Claims. (Cl. 18—5)

The present invention relates to improvements in apparatus and process for manufacturing blown thermoplastic resin bottles and the like.

An object of the invention is to provide improved process and apparatus wherein a thermoplastic resin is extruded as a tubular stream from which a bottle or the like is formed by press molding its neck and corkage portions and blow molding its body portion within a multisection mold.

A further object is to provide improved apparatus of the type indicated in which the extruded resin is severed from its parent supply prior to blow molding the finished article.

With these and other objects in view, the invention consists of the hereinafter described method of operation and the novel combinations, constructions and arrangement of parts shown in the accompanying drawings of illustrative embodiments in which:

FIGURE 1 is a cross-sectional view of a tube of thermoplastic resin extruded from a nozzle into an open multisectional mold of a multi-mold machine in accordance with the invention;

FIGURE 2 is a cross-sectional view similar to FIGURE 1 and showing the mold closed on the plastic tube;

FIGURE 3 is a view similar to FIGURE 2 showing th tubing cut from the nozzle and with a mandrel projecting into the tubing from a blow head;

FIGURE 4 is a cross-sectional view taken on the line 4—4 of FIGURE 3 showing the tube gripped by the closed mold and the plunger therein;

FIGURE 5 is a view similar to FIGURE 3 showing the bottle neck press-molded between the plunger and pressing members;

FIGURE 5A shows a modification of the pinchers and plunger of FIGURE 5;

FIGURE 6 is a view similar to FIGURE 5 showing the tubing blow-molded to shape in the mold; and FIGURE 7 is an elevation view of the blow-molded article from only one side of which flash has been removed.

Referring to FIGURES 1 and 2 of the drawings, there is shown an extrusion head or nozzle 1 having an annular outlet orifice 2 through which a heated or otherwise plasticized and suitably homogenized organic plastic resin such as, for example, polyethylene is extruded in tubular form or shape 3. The extrusion head 1 may be stationarily mounted or movably mounted as, for example, for vertical movement as disclosed in U.S. Patent No. 2,349,176, issued May 16, 1944, to William H. Kopitke. In either case, it is contemplated that the head 1 be so disposed that mold sections 4a and 4b of a multi-section mold 4 may be brought into registry with the extrusion head 1.

In the embodiment illustrated in FIGURES 1-5, the mold sections 4a, 4b preferably are mounted on a rotary turret table 5 which preferably carries a plurality of equally spaced-apart molds (not shown) identical with mold 4.

As is hereinafter described in greater detail, the operation of the molds 4 may be automatically controlled in timed sequence with the operation of the extruder head 1 and other components of the apparatus by suitable timing mechanism (not shown).

The illustrated mold sections 4a and 4b form a mold cavity generally designated 9 (FIGURE 5) in which to blow mold and shape the plastic tubing 3 into a bottle 10 (FIGURE 6).

In the embodiments shown in the drawings, the cavity 9 includes a main body molding portion 9a formed by the mold sections 4a, 4b, against which the tubing 3 is blow molded and a neck molding portion 9b formed by a pair of neck shaping members 11a, 11b which are movable relative to each other and in cooperation with a mandrel 6 serve to compression mold the neck, corkage and finish portions 10a, 10b and 10c, respectively, of the bottle 10 (FIGURE 7).

As shown in FIGURES 3 and 4, the portions of the mold sections 4a and 4b above the neck shaping members 11a, 11b are cut away at 12a and 12b, respectively, to provide a bore 12 which is adapted when the mold sections 4a, 4b are closed to grip and suspend in the molding cavity 9 a length of the tubing 3 which is severed from the nozzle 1 by a knife 15 or other suitable means. The gripping bore 12 may be the same size or only slightly smaller than the diameter of the tubing 3 and rely upon friction to provide the desired support or, as shown in FIGURE 4, the bore 12 may be substantially smaller so that diametrically opposite portions 3a and 3b of the tube 3 are pinched closed and gripped between the mold sections 4a, 4b.

In either case an end of the length of the tube 3 within the mold 4 remains open for the insertion of the mandrel 6 while the other end of the length of the tube 3 is closed as by pinching edges 13a, 13b on the bottom of the mold sections 4a, 4b, respectively.

While the mold 4 of the illustrated embodiments of the invention is shown upright, it is contemplated that the mold 4 may be inverted so that the pinching edges 13a, 13b are located adjacent the nozzle 1 and provide the suspending support for the length of tubing 3 within the mold 4. In the latter case, the bore 12 need not support the length of tubing 3.

However, regardless of whether the bore 12 does or does not support the tubing 3 within the mold 4, the bore 12 does center and align the open end of the tubing to receive the mandrel 6.

As shown in FIGURE 3, the mandrel 6 extends downwardly from a blowhead 16 which is movable into and out of engagement with the top of the mold 4. The movement of the blowhead 16 may be effected by any suitable mechanism. One such mechanism is illustrated and described in the aforesaid Patent 2,349,176.

Preferably the blowhead 16 makes substantially airtight engagement with the top surface of the mold 4 and locates the mandrel 6 within the portion of the tubing 3 which is positioned between the neck shaping members 11a, 11b. The mandrel 6 may be rigidly secured to the head 16 and movable into the tubing 3 as the head 16 is moved into engagement with the mold 4. Preferably, however, the mandrel 6 is movably journaled in the head 16 and is inserted in the tubing 3 from an exterior position after the blowhead 16 has been moved into engagement with the mold 4.

As shown in the drawings, the head 16 and mandrel 6 are both cylindrical members axially aligned with the mold cavity 9. In the illustrated embodiments, the underside of the head 16 preferably is hollowed so as to nonengageably receive the tubing 3. However, the invention in its broader aspects contemplates that the head 16 may be provided with a forming surface (not shown) which can engage and shape the adjacent end of the length of tubing 3 into a lip portion for the bottle rather than shaping the lip or finish 10c as hereinafter described.

As shown in FIGURE 5A, the lip or finish 10c of the bottle 10 is formed by an annular shoulder 6a of a modified mandrel 6'.

Alternatively, as shown in FIGURE 5, the mandrel 6 may form only the inner or corkage surface 10b of the bottle neck and the lip or finish 10c may be formed by annular shoulder portions 18a, 18b of the members 11a, 11b, respectively. A split mold seam is continued from the body and neck 10a of the bottle 10 over the lip or finish 10c in the embodiment shown in FIGURE 5 but is avoided by the continuous shoulder 6a of FIGURE 5A.

In operating the forming apparatus shown in FIGURES 1 to 5, the rotary turret 5 moves the open mold sections 4a, 4b into aligned rotary registry with the extrusion head 1 preparatory to the extrusion of a preselected length of tubing 3. Thereafter the preselected length of tubing 3 is extruded (FIGURE 1) and the mold sections 4a and 4b closed on the tubing, as shown in FIGURE 2 so that the bore 12 grips the top of the tubing while the pinching edges 13a, 13b close the bottom of the tubing and form a bottom seam 21 for the bottle 10. Thereafter, the extruded tubing 3 is severed from the nozzle 1, as by operation of the knife 15, and the mold 4 moved, as by rotation of the turret 5, from its station in alignment with the nozzle 1 to a second station where the blowhead 16 is moved into engagement with the mold 4. Movement of the mandrel 6 into the tubing 3, as shown in FIGURE 3, may be effected either concurrently or subsequently to the movement of the blowhead 16 into contact with the mold 4. In either event, blowing air may be introduced into the tubing 3 through passageway 7 in the mandrel so as to blow mold the bottle 10, as shown in FIGURE 6, either while or after the mandrel 6 is introduced into the tubing and moved to the position shown in FIGURE 5. Preferably the members 11a, 11b are moved to their neck molding positions shown in FIGURE 5 either just prior to or concurrently with the introduction of blowing air into the tubing 3 through the mandrel passage 7.

If the mandrel 6 is inserted in the tubing 3 prior to the closing of the members 11a, 11b, the blowing air preferably is not introduced into the tubing until the members 11a, 11b are closed on the upper portion of the tubing, as shown in FIGURE 5, and in combination with the mandrel 6 press mold the neck and corkage of the bottle.

Preferably, the wall thickness of the tubing 3 is somewhat greater than the clearance between the molding walls of the neck molding members 11a, 11b and the mandrel 6 so that the plastic resin may be firmly molded into thread portions or similar irregular depressions in the neck molding cavity.

As shown in FIGURE 5, the molding members 11a, 11b are cut away to provide semi-circular cutting edges 21 which form a circular orifice that tightly engages the mandrel 6 when the mold sections 11a, 11b are closed so as to seal the mold cavity 9 closed and cause the annular shoulder portions 18a, 18b to mold the lip or finish 10c of the bottle 10.

The cutting edges 21 (FIGURE 6) of the shoulders 18a, 18b virtually sever any excess portion of the tubing 3 that may extend above the lip forming shoulder. Any thin flash which may remain between the cutting edge 21 and the mandrel 6 to connect the neck 10a of the bottle with excess plastic material is readily broken after removal of the bottle 10 from the mold 4. Severance may be aided or completed by withdrawing the mandrel 6 from the bottle 10 before opening the mold sections 4a, 4b. Preferably, the withdrawal is effected with a rotary motion which may be imparted to the mandrel by a variety of means as, for example, threaded engagement of the mandrel 6 with the head 16.

In the modification shown in FIGURE 5A, it is contemplated that the slightly modified mold members 11a', 11b' may be either open or closed prior to insertion of mandrel 6' into the tubing 3.

In the latter case, if desired, the members 11a', 11b' may be integral portions of the mold sections 4a, 4b, or immovably secured thereto. Following closing of the mold sections 4a, 4b, and 11a', 11b', mandrel 6' which is tapered at its end for ready insertion into the tubing 3 is inserted and presses the tubing into shaping engagement with mold cavity wall so as to shape the exterior and interior walls 10a and 10b of the neck of the bottle 10. The last portion of the inward movement of the mandrel 6' shears the excess plastic 19 above the lip 10c from the bottle 10 as shown in FIGURE 5A.

The blowing air may be introduced into the bottle concurrently with or subsequent to the inward movement of the mandrel 6' so as to assist in the neck formation and resist the tendency of the inwardly moving mandrel 6' to drag the plastic out of the neck forming portion of the mold. Generally, it will be found desirable to close the neck forming members 11a' and 11b' after the mandrel 6' has been introduced into the tube 3 and to initiating blowing only after the members 11a', 11b' are closed.

It will be apparent that the excess material 19 when detached from the bottle 10 may be readily removed as by a blast of air after retraction of the mandrel 6.

As soon as the mold sections 4a and 4b have closed, blowing air may be introduced into the plastic bubble within the mold through the passage 7 in the mandrel 6 and the turret 5 may be rotated to remove the mold 4 from beneath the extrusion head 1 so that one or more like molds (not shown) carried by the turret 5 may be successively positioned beneath the head 1 to repeat the extrusion and mold closing operations. In order to achieve optimum efficiency, the blowing operation may be commenced or continued at succeeding positions of the mold 4 and the bottle 10, or other molded article removed at a position just prior to again positioning the mold 4 beneath the extrusion head 1.

The passage 7 which extends downwardly through the mandrels 6 and 6' communicates with an air pressure supply line (not shown). The communication may be continually maintained and air pressure supplied intermittently, as by means of a timer valve (not shown) or, for example, the communication of the supply with the passage 7 may be effected only when the mandrels 6 and 6' are moving towards or are in their lower or advanced positions shown in FIGURES 5 and 5A. It will be understood that the means for intermittently supplying air pressure through the passage 7 in the mandrels are merely illustrative and that a wide variety of alternatives may be employed to properly time and coordinate the air thus supplied with the several operations of the plastic blowing and molding apparatus.

This application is a continuation of my co-pending application Serial Number 412,735 filed February 26, 1954 and now abandoned.

Having thus described the invention, I claim:

1. The method of forming a hollow article of plastic material which comprises extruding tubular plastic material downwardly from an annular orifice, severing a length of tubular material from the material extruding from the orifice to leave the severed end of said length open and gripping the exterior of the upper end of said length of tubular material adjacent its severed end with said end remaining open, thereafter inserting a mandrel into the upper open end of the gripped length of tubular material, press molding against the mandrel a portion of said length adjacent said severed end independent of the gripping of the exterior of the upper end of said length, and blow molding another portion of the length of tubular material with the lower end of said length of tubular material closed.

2. The method of forming a hollow article of plastic material which comprises extruding tubular plastic material downwardly from an annular orifice, severing a length of tubular material from the material extruding from the orifice to leave the severed end of said length open, supporting said open ended, severed length of tubular material within a mold, with one end portion of said length being peripherally restrained by an article portion forming section of said mold advancing a mandrel into the open end of said one end portion of said supported length of tubular material, while restraining said mold against lateral movement away from said mandrel whereby said one end portion of said length of tubular material is press molded between said advancing mandrel and said article portion forming section of said restrained mold, and blow molding another portion of the length of tubular material with the other end of said length of tubular material closed.

3. The method recited in claim 2 and wherein the advancing mandrel cooperates with the mold to shear excess material from the severed end of the press-molded portion of the length of plastic material.

4. Apparatus for forming a hollow article of plastic material comprising a downwardly directed annular extruder nozzle or extruding a tubular length of plastic material, means for severing a length of extruding tubular material from the material extruding from said nozzle to leave the severed end of said length open, a sectional mold, means for gripping the exterior of the upper end of said length of tubular material adjacent its severed end with said end remaining open to suspend said length within said mold, a mandrel mounted to be movable into the upper open end of the gripped length of tubular material, means for inserting said mandrel into the upper open end of the gripped length of tubular material, pinch means movably mounted independently of said gripping means and the sections of said mold to be movable into press molding cooperation with said mandrel to press mold a portion of said length of tubular material adjacent the upper severed end thereof, and means for blow molding another portion of the length of tubular material within said sectional mold.

5. Apparatus as recited in claim 4 and wherein said mandrel has an annular shoulder which cooperates with the press molding pinch means to sever the severed end of the tubular length from the press-molded portion.

6. The method of forming a hollow plastic container having a neck comprising the steps of disposing a tubular formation of heated thermoplastic material between the opened halves of a partible container-defining mold, closing said mold halves on said tubular formation in such manner that the end of the tubular formation adjacent the neck forming portions of the partible mold remains open, and is peripherally restrained by said neck forming mold portions, press molding the neck portion of the container by inserting a mandrel into said peripherally restrained open end of said tubular formation, and expanding the remainder of the mold enclosed portions of the tubular formation to conform to the mold cavity by fluid pressure introduced through said mandrel.

7. The method of forming a hollow article of plastic material which comprises extruding tubular plastic material downwardly from an annular orifice, gripping a length of said tubular material, simultaneously severing the gripped length from the oncoming extrusion in such manner as to leave the severed ends open, relatively moving the gripped length and the orifice, thereafter inserting a mandrel into an open and peripherally restrained end of the gripped length to press mold an article portion defining section of the gripped length around said mandrel, and blow molding another portion of the gripped length.

8. The method of forming a hollow plastic container as recited in claim 6 wherein as said mandrel is inserted into said open end of said tubular formation to press mold the neck portion of said container, fluid is introduced through the mandrel.

9. The method of forming a hollow article of plastic material as recited in claim 2 wherein said mandrel is advanced into the upper open end of said supported length of tubular plastic material and wherein the blow molding of another portion of said length of material is effected with the lower end of said length closed.

10. The method of forming a hollow article of plastic material as recited in claim 7, said article being a container having a threaded neck and a body, wherein a blow mold defining the complete container is closed onto the length of tubular material, the mandrel is inesrted into the open end of said length peripherally restrained by a first, threaded portion of the blow mold defining the container threaded neck, and the remaining portions of said length are subsequently blow molded against a second portion of the blow mold defining the container body.

References Cited in the file of this patent

UNITED STATES PATENTS

| 2,783,503 | Sherman | Mar. 5, 1957 |
| 2,810,934 | Bailey | Oct. 29, 1957 |
| 2,898,633 | Burch | Aug. 11, 1959 |
| 2,903,740 | Parfrey | Sept. 15, 1959 |

FOREIGN PATENTS

| 1,029,586 | France | June 3, 1953 |